May 21, 1929.  J. F. HARLEY  1,714,023
STRUCTURE FOR TIRE HOLDERS AND THE LIKE AND METHOD OF MAKING THE SAME
Filed June 9, 1927
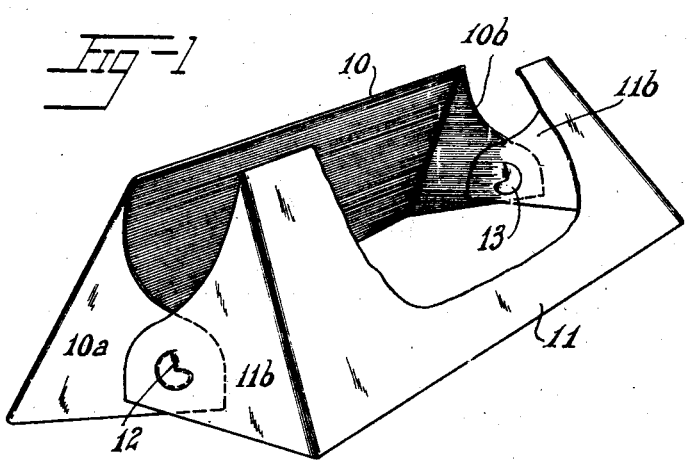
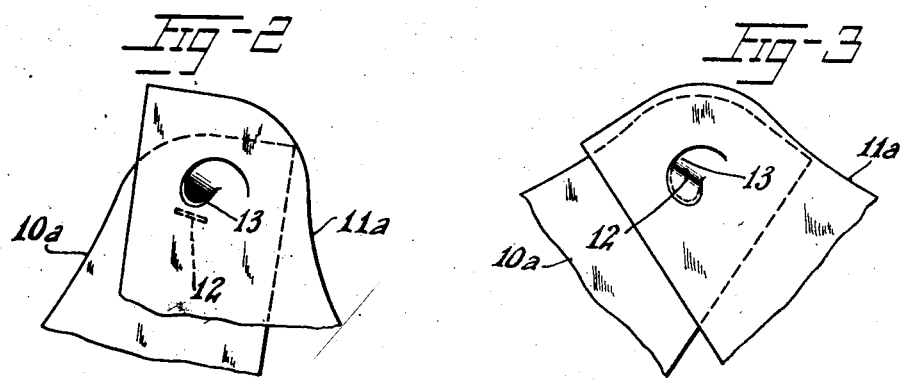
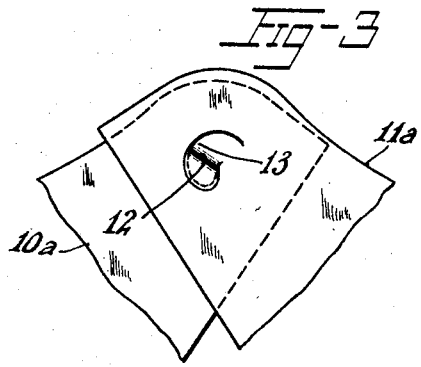
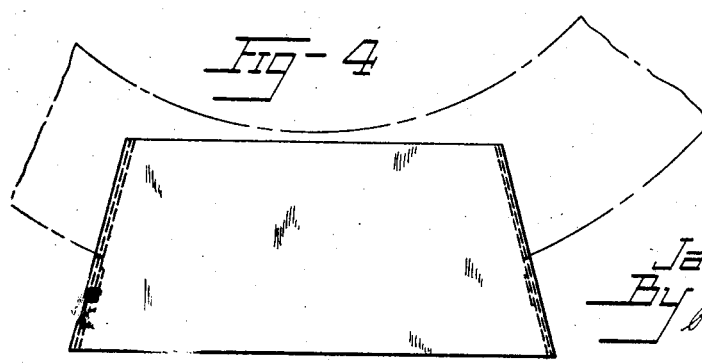
INVENTOR
Jacob F. Harley
By Pierson, Eakin & Avery
Attys-

Patented May 21, 1929.

UNITED STATES PATENT OFFICE.

JACOB F. HARLEY, OF AKRON, OHIO, ASSIGNOR TO THE B. F. GOODRICH COMPANY, OF NEW YORK, N. Y., A CORPORATION OF NEW YORK.

STRUCTURE FOR TIRE HOLDERS AND THE LIKE AND METHOD OF MAKING THE SAME.

Application filed June 9, 1927. Serial No. 197,623.

This invention relates to hinge constructions suitable for hinging one sheet metal member to another substantially parallel therewith, for relative hinging movement of each member in its own plane, and to methods of making such hinge structures.

The invention is especially advantageous in sheet-metal display stands for tires consisting of a pair of sheet metal members so formed and hinged together that their upper portions are adapted to grip the tire and hold it upright as the result of the weight of the tire acting through the hinge axis of the two members, their lower portions being so shaped as to engage the floor only at points laterally remote from the hinge axis.

Heretofore, so far as I am aware, such members have been hinged together by means of bolts or the like, which have been an item of expense and which have caused annoyance and inconvenience in that they are not of convenient shape to be snugly packed with the sheet metal members for shipment and are frequently lost during or after shipment.

My chief objects are economically to provide a hinge structure for uses such as that referred to; to provide for quick detachability of the hinged sheet metal members; to provide a strong hinge structure; to eliminate the need for bolts, rivets, or similar fastening means in a hinge construction for parallel sheet metal members; and to provide further and more detailed advantages which will be manifest.

Of the accompanying drawings:

Fig. 1 is a perspective view, with a part broken away, of a tire-display stand embodying my invention in its preferred form.

Fig. 2 is a fragmentary elevation illustrating the manner of assembling the sheet metal members in hinged relation.

Fig. 3 is a fragmentary elevation showing the assembling operation at a later stage.

Fig. 4 is a side elevation of the assembled tire holder, the position of the tire therein being indicated by broken lines.

Referring to the drawings, the tire stand, constituting one of many possible embodiments of the invention, comprises a pair of sheet metal members 10, 11 so cut and bent as to provide two transversely projecting, parallel end wings $10^a$, $10^b$ or $11^a$, $11^b$ on each for hinging the two members together at each end of the assembly, the sheet metal members being also so formed as to provide a tire-receiving space between the upper portions of each pair of end wings $10^a$, $11^a$ or $10^b$, $11^b$, the said end wings being adapted to close upon and grip the tire in a hinging action of the two members effected by reason of the fact that the weight of the tire is sustained by contact of the members with the floor only at points laterally remote from their hinge axis.

For hinging each wing portion of the member 10 to the adjacent wing portion of the member 11 one of the wing portions is formed with an approximately vertical slot such as the slot 12 and the other wing portion is so stamped and bent as to provide a hook, such as the hook 13, preferably having a full turn of 180°. The hook is so positioned that its point will extend in a direction away from the member with which it is interlocked when the device is assembled.

Preferably each of the members 10 and 11 is formed with a hook on one of the wings and a slot in the other, so that both of the members may be alike.

Preferably the bight of the hook is formed by a single cut, without removal of any metal, and the hook is formed of a width only slightly less than the length of the slot 12, which gives the outer margin of the hook the form of an arc concentric with the inner end of its bight.

The hook is bent out of the plane of the adjacent part of the sheet and is engaged in the slot 12 by holding the two members so that their wing portions are in the relative positions illustrated in Fig. 2 as to the portions $10^a$ and $11^a$ and then relatively moving them to pass the hooks into the slots. The two members are then swung, about the hooks and slots as an axis, through their positions of Fig. 3 to their positions of Fig. 1, after which they are manipulated in the same manner, for mounting and removing the tires, as if they were hinged together by means of hinge bolts.

The forms and relative dimensions of the slots and hooks as described are such that substantially all play in the hinges is avoided and at the same time a free hinging action is provided, and the two sections are securely although pivotally interlocked with each other until such time as they are turned back to the relative positions of Fig. 2. They readily may be separated from each other at will, however, by turning them to such positions. The structure is very strong, as the forces against the hook and against the walls of the slot are taken substantially in the plane of the sheet metal.

Modifications are possible within the scope of my invention as defined in the appended claims.

I claim:

1. A hinge structure comprising two members of sheet material hinged together for movement about an axis non-parallel to their planes, one of said members being formed with a slot and the other being formed with a hook extending out of its general plane and engaged in said slot.

2. A hinge structure as defined in claim 1 in which the two members are of sheet metal and the hook is an integral part of the sheet metal of the member upon which it is mounted.

3. A hinge structure comprising two sheet metal members hinged together for movement about an axis non-parallel to their planes, one of said members being formed with a slot and the other being formed with a stamped and bent hook extending out of the general plane of the member of which it is a part, the bight of the hook being of substantially no greater width than is essential for mounting the hook in the slot and the width of the hook being so nearly equal to the length of the slot as to prevent disengagement of the hook from the slot in a substantial arc of relative movement of the members about the hinge axis.

4. A hinge structure comprising a pair of members of sheet material, one of the said members having a slot therein, and the other of the said members being provided with a hook adapted to extend out of the general plane of the said member, to engage the portion of the first-mentioned member defining the slot therein and to hinge the two members together for relative movement thereof approximately in their respective planes.

In witness whereof I have hereunto set my hand this 2nd day of June, 1927.

JACOB F. HARLEY.